Dec. 4, 1928.

G. A. TAYLOR 1,694,024

DISPLAY DEVICE

Filed Dec. 22, 1924     2 Sheets-Sheet 1

INVENTOR
George A. Taylor
BY
Mayer, Warfield and Watson
ATTORNEYS

Dec. 4, 1928.  1,694,024
G. A. TAYLOR
DISPLAY DEVICE
Filed Dec. 22, 1924   2 Sheets-Sheet 2
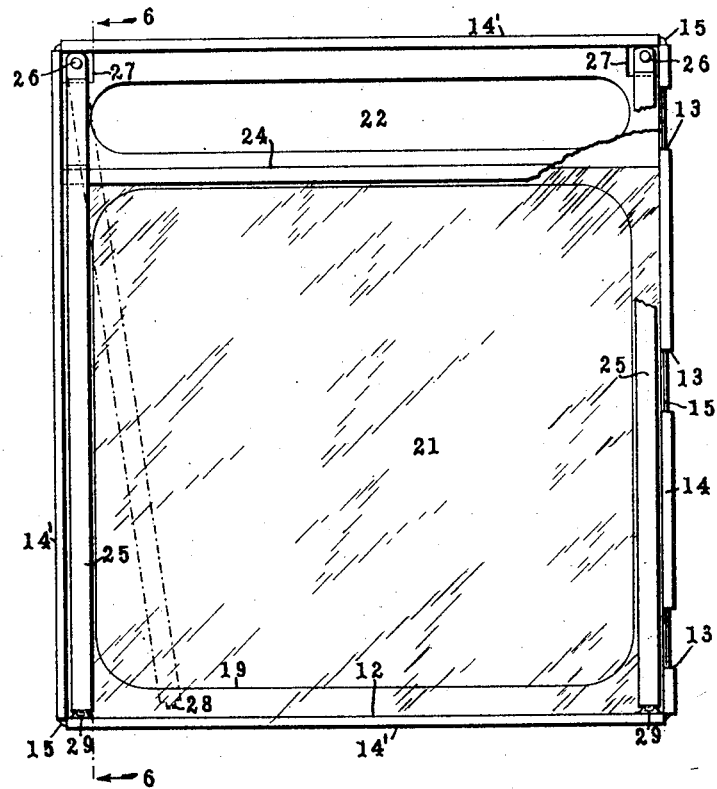
*Fig.5*
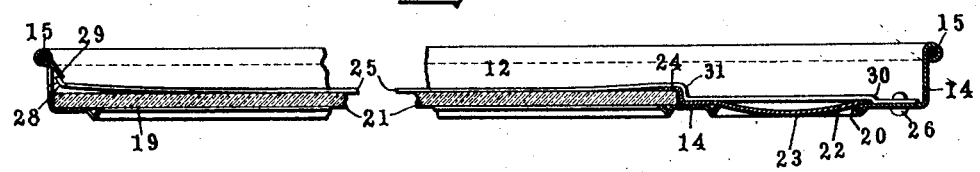
*Fig.6*
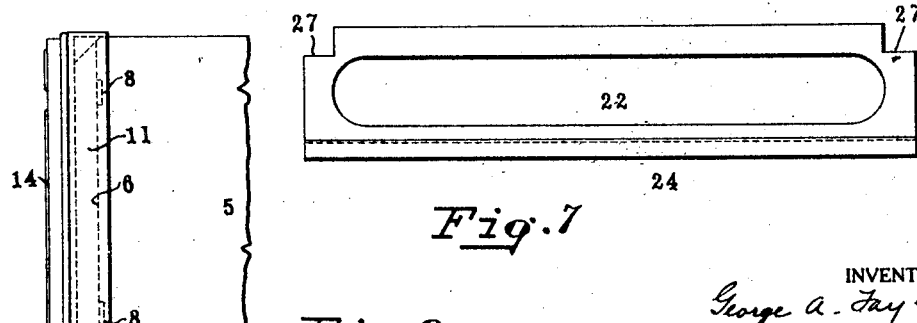
*Fig.7*
*Fig.8*
INVENTOR
George A. Taylor
BY
Mayer, Warfield and Watson
ATTORNEYS Patented Dec. 4, 1928.

1,694,024

UNITED STATES PATENT OFFICE.

GEORGE A. TAYLOR, OF BERGENFIELD, NEW JERSEY, ASSIGNOR TO NATIONAL BISCUIT COMPANY, OF NEW YORK, N. Y., A CORPORATION OF NEW JERSEY.

DISPLAY DEVICE.

Application filed December 22, 1924. Serial No. 757,342.

This invention relates to a display front or cover of improved construction particularly adapted to be utilized to display the contents of receptacles.

It is an object of the invention to present a device of the character stated, which, although useful in numerous different associations, is particularly adapted to be employed for the display of goods such as crackers, cakes, etc.

A further object of the invention is that of providing an improved display front or cover which may be used to greater advantage than has heretofore been the case in connection with previous devices of a similar nature.

A still further object of the present invention is that of constructing a display device the parts of which may be readily renewed and replaced, aside from the fact that the structure of the same will be of an extremely simple nature, thus permitting of the use of the device over a relatively long period of time.

An additional object is that of providing a device which will efficiently perform the purposes for which it is intended, and which will also be economically and readily manufactured and assembled.

Other objects of the invention will in part be obvious and will in part appear hereinafter.

The invention accordingly comprises an article of manufacture possessing the features, properties, and the relation of elements which will be exemplified in the article hereinafter described, and the scope of the application of which will be indicated in the claims.

For a fuller understanding of the nature and objects of the invention reference should be had to the following detailed description taken in connection with the accompanying drawings, in which:

Fig. 5 is an elevation of the rear of the display door which forms a part of the cover;

Fig. 6 is a sectional view taken along the line 6—6 and in the direction of the arrows indicated in Fig. 5;

Fig. 7 is a rear view showing one of the elements of the cover detached from the body thereof; and Fig. 8 is a side view of the display device showing same disposed across the front of a receptacle.

Figure 1:
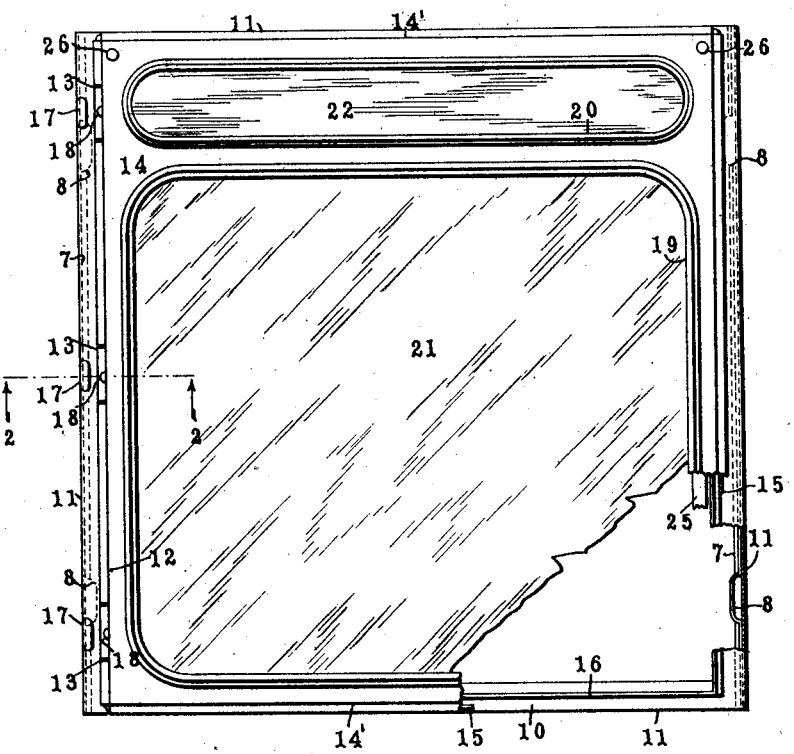
Fig. 1 is a front elevation of one form of display device embodying the improved construction of the present invention.

The invention, as aforestated, will find its most general use in connection with display fronts for receptacles, and it may be employed either in display fronts forming an integral part of the receptacle or in display fronts of the type which is adapted to be slipped over the top or one side of a receptacle after the removal of the initial cover or front wall therefrom.

In its present exemplification, the invention is embodied in a display front of the latter type, being adapted to be employed in connection with a receptacle such as illustrated at 5, which may be used for the shipment, storage and display of crackers or other merchandise. The receptacle 5 is formed with an open front and is normally closed by means of an initial cover which is either wholly removable or is of a type which may be folded back against one wall of the receptacle, usually the top. In the present instance, a portion of one or more of the sides of the receptacle is folded back against the outer surface thereof, as shown at 6, so as to form a protuberance extending along the same adjacent its front edge. The particular display front under consideration includes a body 10 formed with rearwardly extending flanges 11 which are adapted to be telescopically disposed relative to the walls of the receptacle, and which are somewhat wider than the bent-over portions 6. The edges of the flanges 11 are preferably beaded as shown at 7, and one or more portions of the bead are distorted so as to form lugs 8, which are adapted to contact with the rear edge 9 of the bent-over portions 6 so as to retain the display front on the receptable. The receptacle 5 will as a general rule be constructed of cardboard or other inexpensive material; while the body of the display member 10 is preferably made of metal, both because of the strength and permanence secured by such construction, and because of the economy of manufacture thereof and the small amount of space occupied thereby. The member 10 is in the nature of a frame, and in order to close the opening of the same a display member 12 in the nature of a door is hingedly attached to the front surface thereof, as indicated at 13. The member 12 comprises a preferably metallic body or frame member 14 formed with rearwardly-extending flanges 14', the rear edges of which are in the present instance bent to embrace a frame-stiffening wire 15 which extends completely around the frame 14 and serves as a pintle for the hinges 13. In order to properly seal the display front against the entrance of such materials as would be harmful to the contents of a receptacle, the body member 10 may be formed with a flange 16 which extends outwardly therefrom and normally adjacent the inner face of the flange 14'.

Figure 2:
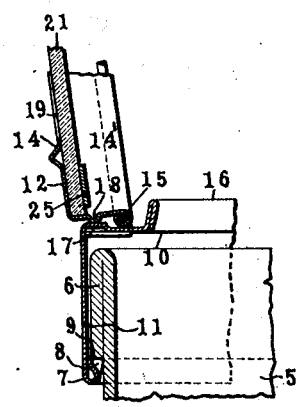
Fig. 2 is an enlarged fragmentary sectional view taken along the line 2—2 and in the direction of the arrows indicated in Fig. 1, but showing the parts in open position.
Figure 3:
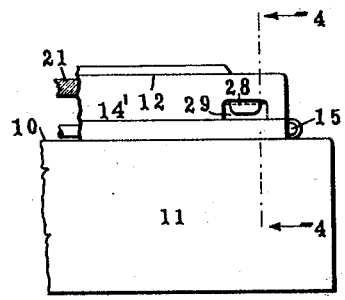
Fig. 3 is a view similar to Fig. 2, but showing the parts in closed position.
Figure 4:
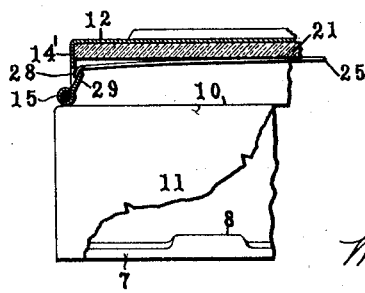
Fig. 4 is a fragmentary transverse sectional view taken along the line 4—4 and in the direction of the arrows indicated in Fig. 3 and illustrating the display front as used in connection with a receptacle.

Inasmuch as it is common practice to arrange a number of receptacles equipped with display fronts in a row it is desirable that the movements of the door be limited so as to not interfere with or damage an adjacent receptacle or cover. To this end there are provided in the exemplification under consideration cooperating protuberances 17 and 18, formed respectively on the members 10 and 12, which serve to limit the opening movement of the latter, as has been clearly brought out in Fig. 2.

One or more openings are necessarily provided in the display member through which the contents of the receptacle, and various legend-bearing members may be displayed. In the present instance the face of the body 14 of the door is formed with a wide lower opening 19 and a narrow upper opening 20, and these openings are covered by a panel 21 formed of transparent material, such as glass, and a panel 22 formed preferably of metal and adapted to contain on its front surface printed matter indicating, for example, the kind of articles contained in the receptacle or the name of the manufacturer thereof. The portion of the panel 22 containing these legends is in the present instance bowed outwardly, as indicated at 23, so as to more effectively emphasize the matter displayed thereon, and this panel is also formed with an offset portion 24 which, as will be apparent from an inspection of Figs. 5 and 6, overlaps and serves as a retaining flange for the transparent panel 21.

The means provided in the present exemplification for retaining the panels 21 and 22 in position includes a pair of panel-retaining strips 25, which are pivotally attached to the upper portion of the face of the frame 14', as indicated at 26, the corners of the panel 22 being cut away, as shown at 27, in order to permit this attachment. As will be apparent from the drawings, the attachment 26 is such as to allow the strips 25 to be moved in a plane substantially parallel to the planes of the panels and of the face of the frame.

In the present instance the strips 25 are detachably secured to the lower portion of the frame 14 by means of cooperating projections 28 and 29 formed respectively on the lower end of the strips 25 and on the lower flange 14', and shaped, in the manner indicated in Fig. 6, so as to hold the strips in a position in which they bear against the panel. The strips 25 have their bodies bent as at 30 and 31 to conform to the inner surfaces of the parts associated with the door, and are preferably formed of resilient material so that they will yieldingly press against these parts to retain the same in position, and, due to such resiliency, an accidental detachment of the strips will be virtually precluded.

From the foregoing description, certain of the advantages inherent in the use of retaining means of the type exemplified by the strips 25 will be apparent. In the assembly of the display front under consideration the strips 25 are swung upwardly so that they will cross each other and lie adjacent to the upper end of the frame, whereupon the glass panel 21 may be put in place and the panel 22 thereafter slid above the panel 21 and under the retaining strips. The retaining strips are then swung downwardly and the projections 28 pressed under the projections 29 so as to secure the strips in their operative position. Whenever it is desired thereafter to remove or replace either of the panels, the strips 25 may be readily moved from their retaining position by detaching the portions 28 and 29 and swinging the strips upwardly. It will be noted that by the employment of retaining means which are so attached to the frame as to be swung in a plane parallel to the face thereof, very little room is required to make the adjustments above described, and in the present construction the display front may be assembled or disassembled, even though some obstruction may prevent the door 14 from being swung to a wide-open position; or, when the panel-containing frame forms an integral part of the receptacle itself, the retaining strips may be readily moved to an inoperative position without so obstructing the interior of the receptacle that the removal or insertion of panels is rendered difficult.

From the foregoing it will be understood that the objects of this invention have been accomplished, and since certain changes may be made in the above article and different embodiments of the invention could be made without departing from the scope thereof, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. In a display member, in combination, a frame, a panel associated therewith, and panel-retaining means extending entirely across said panel, said means being pivotally mounted on the frame for movement in a plane parallel to the plane of said panel, and a device located on said frame beyond said panel for detachable engagement by the outer end of said retaining-means.

2. In a display member, in combination, a frame having a plurality of openings formed in the face thereof, panels covering said openings, and panel-retaining means extending entirely across said panels and pivotally mounted on said frame for pivotal movement in a plane parallel to its face.

3. In a display member, in combination, a frame, a panel associated therewith, and means for retaining said panel in association with said frame, said means extending entirely across the panel and being pivotally mounted at one point on said frame for movement in a plane parallel to the plane of said panel, and means located beyond said panel for normally preventing a movement of said retaining means.

4. In a display member, in combination, a frame formed with a plurality of openings, panels extending across each of said openings, and means to retain said panels in position, said means being pivotally and permanently mounted on said frame at a point beyond one of said panels and detachably mounted thereon at a point beyond another and bearing in direct contact against the rear faces of both of the same.

5. In a display member, in combination, a frame formed with an opening, a panel covering said opening, and means connected with said frame for retaining said panel in position, said panel being formed with a cut-out portion for the accommodation of said retaining means.

6. In a display member, in combination, a frame formed with a plurality of openings, a transparent panel extending across one opening, and an opaque panel extending across another of the same, and means to retain said panels in position, said means extending across both of said panels and being pivotally mounted on said frame at a point beyond one of said panels and detachably mounted thereon at a point beyond another of the same.

7. In a display member, in combination, a frame, a pair of panels associated therewith, and a single resilient retaining means adapted to bear against the rear faces of both of said panels.

8. In a display member, in combination, a frame, a panel associated with the frame, elongated panel-retaining means extending entirely across said panel and pivoted at one end to said frame for detachably securing said panel in position, means forming a part of said retaining-means and engaging one edge of the panel to oppose the movement thereof in the direction of said edge, and means located on said frame beyond said panel for detachably engaging the outer edge of said retaining-means.

9. In a display member, in combination, a frame having an opening in the front thereof, a panel extending across said opening, and panel-retaining means extending entirely across said panel and adapted to tightly hold said panel adjacent one of its edges and to yieldably hold the same adjacent an opposite edge.

10. In display member, in combination, a frame, a pair of panels associated therewith and a panel-retaining strip extending transversely across both of said panels and bearing against the same.

11. In a display member, in combination, a rectangular frame, a plurality of panels extending between one pair of parallel frame edges, and a plurality of panel-retaining strips extending between the other pair of parallel frame edges.

12. In a display member, in combination, a frame, a panel associated therewith, and a pair of retaining strips extending along the sides of the panel, said strips being pivoted at one end on said frame for free pivotal movement in a plane parallel to the plane of said panel.

13. In a display member, in combination, a frame, a pair of laterally-extending panels associated therewith, a pair of vertically-extending panel-retaining strips mounted on said frame to normally hold said panels in association therewith and means whereby said strips may be released.

14. In a display member, in combination, a frame formed with openings in the face thereof, a panel covering each of said openings, and a pair of panel-retaining strips pivotally attached to said frame at a point above said panels for movement in a plane parallel to said face and detachably mounted on said frame at a point beneath said panels.

15. In a display member, in combination, a frame comprising a display face and rearwardly-extending flanges, a panel associated with said display face, and means to hold said panel in position, said means being attached at one point to said display face, and at another point to one of said flanges.

16. In a display member, in combination, a frame comprising a display face and rearwardly-extending flanges, a panel associated with said display face, and means to hold said panel in position, said means being attached at one point to said display face for pivotal movement in a plane parallel thereto and detachably mounted at another point to one of said flanges.

17. In a display member, in combination, a frame and a plurality of panels associated therewith, one of said panels having an offset portion adjacent one of its edges to provide a retaining flange for another of said panels.

18. In a display member, in combination, a frame formed with an opening in the face thereof, a panel extending across said opening, and means to yieldably hold said panel against said frame, said means extending entirely across said panel and being at one end pivotally attached to the face of said frame.

19. In a display member, in combination, a frame presenting an opening in the face thereof and formed with rearwardly-extending flanges, a panel positioned to the rear of said face and extending across said opening, a retaining strip for said panel pivotally attached to said frame for movement in a plane parallel to the face thereof, and cooperating projections on said strip and said flange adapted normally to retain said strip in its operative position.

20. A display device, including a frame formed with an opening, a panel covering said opening, a strip connected with said frame and bearing against said panel to retain the same in position, said strip extending entirely across said panel and having its body bent to engage one of the end-portions of said panel, and means located on said frame beyond said panel for detachably engaging the outer end of said strip.

21. A display device, including, in combination, a frame formed with a pair of openings, panels covering each of said openings, one of said panels being formed with an offset portion overlapping a part of the second of the same, panel-retaining means pivotally secured to said frame adjacent the upper end thereof and mounted for movement in a plane parallel to the panel bodies, and means for detachably securing the opposite ends of said retaining means against movement.

In testimony whereof I affix my signature.

GEORGE A. TAYLOR.